United States Patent [19]
Delmar et al.

[11] Patent Number: 5,435,878
[45] Date of Patent: Jul. 25, 1995

[54] METHOD FOR WELDING POLYCARBONATE BY HIGH FREQUENCY

[75] Inventors: Jean-Claude Delmar, Couches; Christian Schmuckle, Chalon S/Saone, both of France

[73] Assignee: Gemplus S.C.A., Gemenos, France

[21] Appl. No.: 678,255

[22] Filed: Apr. 18, 1991

[30] Foreign Application Priority Data

Oct. 18, 1988 [FR] France ............... 88 14222

[51] Int. Cl.⁶ ............................................. B32B 31/00
[52] U.S. Cl. .................... 156/272.2; 156/272.4; 156/273.3; 156/274.4; 156/289
[58] Field of Search ............ 156/272.2, 273.3, 274.4, 156/272.4, 289

[56] References Cited

U.S. PATENT DOCUMENTS

| | | | |
|---|---|---|---|
| 1,806,846 | 5/1931 | Fox | 156/274.4 |
| 2,806,116 | 9/1957 | Hoagland | 156/274.4 |
| 3,291,671 | 12/1966 | Hecht | 156/274.4 |
| 3,654,013 | 4/1972 | Willsie et al. | 156/273.3 |
| 4,096,015 | 6/1978 | Kawamata et al. | 156/274.4 |
| 4,678,713 | 7/1987 | Lancaster et al. | |

FOREIGN PATENT DOCUMENTS 2120070 8/1972 France .
2312629 1/1974 Germany .

OTHER PUBLICATIONS

"Dielectric Heating," *Encylopedia of Polymer Science & Technology* vol. 5, 1986.
Readdy, A. F., "Plastics Fabrication by Ultraviolet, Infrared, Induction, Dielectric, & Microwave Radiation Methods," Plastics, Picatinny Arsenal, Dover, N.J. 1972 p. 57.
Japanese Patent Gazette, Semaine D05, 11 mars 1981, section CH, classe A, p. 2, resume No. 06553, Derwent Publications Ltd. Londres, GB & JP-A-55 150321 (Sumitomo Bakelite K.K.) 22 Nov. 1980 voir resume (cite dans la demande).
Japanese Patent Gazette, semaine 8732, 23 Sep. 1987, section CH, classe A, p. 26, resume No. 87-225838/32, Derwent Publications Ltd., Londres, GB & JP-A-62 151 323 (Nippon Shigyo K.K.) 6 Jul. 1987.

*Primary Examiner*—Chester T. Barry
*Attorney, Agent, or Firm*—Oblon, Spivak, McClelland, Maier & Neustadt

[57] ABSTRACT

The invention relates to a method for welding thermoweldable sheets of which at least one is made of polycarbonate. The method is characterized in that the sheets to be welded are separated from the metal electrodes (4,5) of the high frequency press by means of a glass plate (2,3). Application to the fabrication of high density magnetic cards.

19 Claims, 2 Drawing Sheets

METHOD FOR WELDING POLYCARBONATE BY HIGH FREQUENCY

This application is a continuation of PCT/FR89/00541, filed Oct. 18, 1989, now abandoned.

The present invention relates to a method for the high-frequency welding of sheets to one another, at least one of these sheets being made of polycarbonate.

There are known methods in the prior art for welding polycarbonate sheets together. The method most commonly used consists in combining the effects of heat and pressure. In this method, the sandwich formed by the different sheets to be welded is introduced into a heat press. The temperature should be higher than the glass transition temperature of the plastic material and this temperature is generally between 160° C. and 180° C. The pressure applied varies between 100 and 1000 N/cm$^2$. Owing to the time taken for the temperature build-up and cooling under pressure, the time needed to weld these polycarbonate sheets is generally from 40 to 45 minutes.

In the same way, there is a known method, in the prior art, for using high frequency to weld certain materials.

High-frequency welding results from the heating of the material to be welded by the application of a high-amplitude high-frequency AC voltage. To be weldable by high frequency, a plastic material should be permanently dipolar and should be constituted by mobile molecular chains capable of oscillating, with their mobility depending on numerous parameters, notably on the conditions of manufacture, internal and external plasticization, temperature, frequency and amplitude of the high frequency. Thus, PVC is a particularly appropriate material for being welded by high frequency. This welding is done between two metal electrodes kept under pressure during the application of the high frequency. Now, trials have demonstrated that such a technique cannot be applied to polycarbonate, one reason for this being that the temperature for starting the reaction (about 100° C. or more) is too high.

Thus the U.S. Pat. No. 4,678,713 shows that polycarbonate belongs to this category of materials that cannot be welded by high frequency. In fact, according to this patent, the welding of polycarbonate implies the use of an adhesive layer formed by polymers containing carbon monoxide.

Similarly, the application JP-A-55 150 321 also shows that polycarbonate is among the materials, having a low dielectric dissipation factor, that cannot be dielectrically welded by themselves. Hence, a layer of a plastic resin with a high dielectric dissipation factor is added to these materials, making said materials with a low dissipation factor capable of being welded by high frequency.

The document FR-A-2 120 070 describes a method for the welding, notably, of two polycarbonate sheets, several millimeters thick, that have been shaped beforehand by undergoing heating at a temperature of the order of 150° C. This method consists in joining these two shaped sheets by inserting them between two rigid glass plates that have complementary facing surfaces, and in then heating the whole in an autoclave at a temperature of 149° C. and a pressure of several kilograms per cm$^2$. This method is not suitable for polycarbonate sheets having a thickness of the order of one-tenth of a millimeter.

An object of the invention, therefore, is a method for the welding of polycarbonate sheets in a period of time that is appreciably shorter than that obtained by the prior art methods.

Yet another object of the present invention is to enable the high-frequency welding of polycarbonate sheets to one another without the use of additional adhesive-forming sheets.

Other objects of the present invention shall appear in the following more detailed description.

The invention relates to a method for the welding of at least two polycarbonate sheets, wherein:
the sheets that are to be welded to one another are superimposed so as to form a sandwich,
the sandwich thus made is introduced between the two glass plates,
characterized in that
each of said glass plates cooperates with a metal electrode of a press of the high-frequency heating type,
the press is put under pressure,
electric signals are applied to said metal electrodes, the frequency of which is appropriate to exciting the molecular bonds of the materials of said polycarbonate sheets, through said glass plates, and
cooling is done.

The following description is made with reference to the drawings, Wherein.

Figure 1:
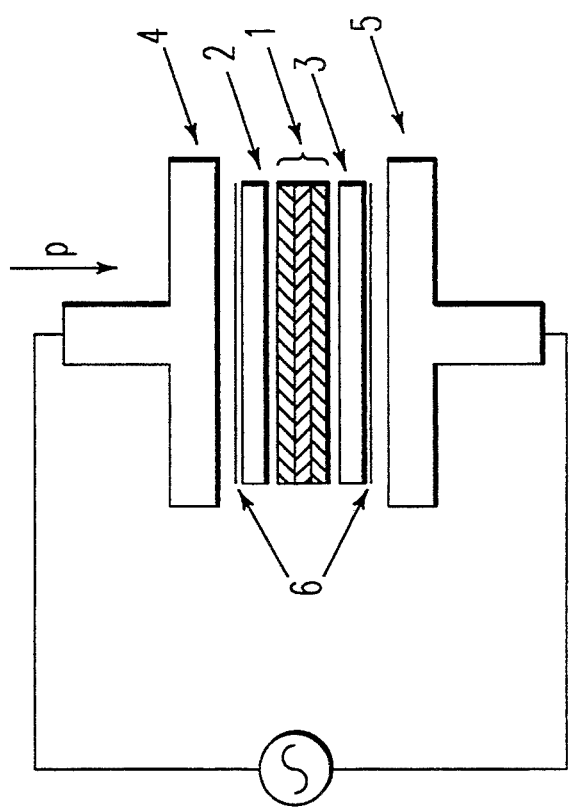
FIG. 1 shows a schematic view of the general device for implementing the method according to the invention.

We shall now refer to FIG. 1 showing a schematic view of the general device for implementing the method according to the present invention.

First of all, the sheets to be welded together are superimposed to form a "sandwich" (1). This sandwich (1) may be formed by polycarbonate sheets alone or else by polycarbonate sheets mixed with sheets of another material such as PVC for example.

The sandwich thus made is then preferably placed between two glass plates (2), (3), but actually it is enough for one of the faces of the sandwich to be in contact with a glass plate. This glass should have certain characteristics. It should be capable of withstanding heat shocks as well as compression. To this effect, tempered plate glass or a glass ceramic of the vision of Corning ™ type may be used.

The thickness of the plates varies as a function of the thickness of the layers to be joined together, and may be of the order of 2 to 5 mm.

The assembly formed by the polycarbonate sandwich in between the two glass plates is then placed between the jaws (4), (5) of the press constituted by two metal blocks. At the same time, the two metal blocks play the role of the electrodes for applying the high frequency.

In a preferred embodiment of the present invention, a sheet (6) is provided, made of a flexible material that does not react to high frequency, between the glass plates and the metal forming each electrode, to absorb the defects due to poor planeity of the electrode surface or of the surface of the glass plates, in contact with the metal electrode. As a matter of fact, owing to the pressure exerted, it is absolutely indispensable that no bending stress should be exerted on the glass plates when they are under pressure. For example, cardboard or Teflon TM may be used.

Then, when the assembly is thus arranged, the pressure (between 100 and 1000 N/cm²) is established and the welding is done by the application of high frequency. The high frequency should have a value such that it can excite the molecular bonds of the polycarbonate and is generally between 25 and 30 MHz, and preferably 27.12 MHz. Under these conditions, the time taken to apply the high frequency may be of the order of 5 s to 20 s and is generally less than 10 s. After that, it is necessary to wait for the assembly to cool before separating the polycarbonate sandwich from the glass plates.

In a preferred embodiment of the present invention, the cooling is done by keeping the sandwich under pressure. As a matter of fact, it has been observed that when the pressure existing during the application of the high frequency is removed, defects such as bubbles for example are obtained, and these defects may be troublesome for certain applications.

Figure 2:
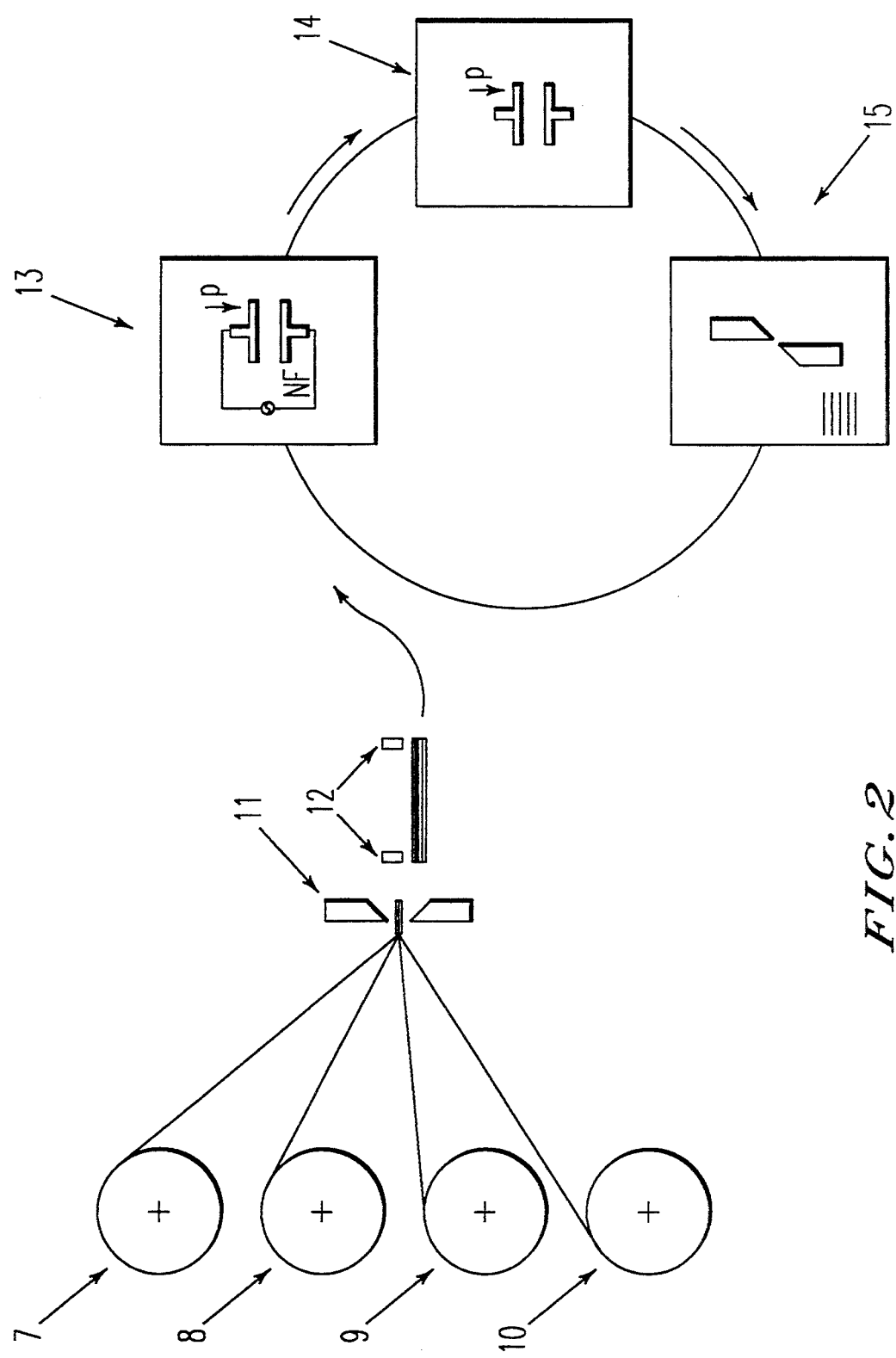
FIG. 2 shows a schematic view of an embodiment of a device for implementing the method, according to the invention, for the manufacture of high-density magnetic cards.

We shall now refer to FIG. 2 which schematically illustrates an example of a device for the implementation of the method for the manufacture of high-density magnetic cards.

The magnetic card that is to be made is a high-density magnetic card with a semi-rigid and dimensionally stable support bearing, on the major part of at least one of its surfaces, a magnetic recording medium formed by magnetic particles. The card support and the magnetic medium itself should have a certain elasticity, i.e. they should capable of recovering their original shape even after repeated bending. The card should also be stable under heat to withstand the usual environmental temperatures without deformation. For these reasons, it has been chosen to make the card out of polycarbonate, using several superimposed layers.

This card is therefore formed by a certain number of polycarbonate sheets, ranging from two to ten, so that a sandwich is made with a thickness of between 400 $\mu$m and 1000 $\mu$m, at least one of these sheets bearing a magnetic layer. These polycarbonate sheets may be made, for example, of LEXAN TM (manufactured by General Electric Co.). The thickness of each sheet varies between 25 $\mu$m and 200 $\mu$m. In fact, a higher weldability is observed with thin layers than with thicker layers, one reason for this being that the thinner the sheets, the greater will be the calorific losses by conduction through the electrodes. This means that a greater quantity of energy is needed to weld thin sheets.

The magnetic layer too is coated on a polycarbonate support having a thickness that varies between 25 $\mu$m and 75 $\mu$m. The thickness of the magnetic layer is about 5 $\mu$m.

In the case of our example shown in FIG. 1, the card is made out of four polycarbonate layers (7), (8), (9), (10) including the layer supporting the magnetic layer.

By using roller feed devices, devices for the conveying, guiding and centering of the tracks, these tracks are perfectly superimposed on one another. By appropriate means (11), a first cutting is then done to obtain a sandwich having the area needed to make three cards (or more, depending on the dimensions of the press). To keep the various layers perfectly superimposed, a first welding (12) is done at each corner of the sandwich. This welding may be done by ultrasonic means. The sandwich is then introduced into a multi-station device comprising essentially a press that enables the high frequency to be applied (13), a press provided with a cooling circuit (14) and a device for cutting the individual cards (15).

The sandwich first passes between the jaws of the press (13) enabling high frequency to be applied. Each jaw of said press is provided with a glass plate having a thickness of the order of 5 mm. The pressure is then set up, and finally the welding is carried out by the application of the high frequency.

The following are the operating conditions in our embodiment:

Area of the sandwich to be welded: 200 mm × 90 mm;
Press power: 6 KW;
HF frequency: 27.12 MHz;
Pressure on the sandwich: 100–200 N/cm²
Intensity provided by the generator: 1.5 A
HF application time : $\approx$ 10 s.

After this, the sandwich has to be cooled before it can be released. For, the welding temperature has to be higher than the glass transition temperature of the polycarbonate, and is generally between 130°–190°. Owing to the planeity of the surfaces required for such an application, this cooling is done by maintaining the pressure used during the welding. This can be carried out in the press used for the welding. About 30 s are needed to come down to the desired temperature (about 30° C.–35° C). In our embodiment, in order that the high frequency press may be freed more quickly, there is provision for another press (14), equipped with a cooling circuit, an appropriate system being provided to transfer the sandwich under pressure into said cooling press.

When the desired temperature is reached, the sandwich is removed and sent to a cutting station (15) where the individual cards are then made.

According to a preferred embodiment, before the sandwich is introduced between the jaws of the high-frequency press, it is passed into a pre-heating device. This may be, for example, a heat press, the upper and lower jaws of which are taken to a temperature of over 100° C., preferably of the order of 150° C. In one embodiment, the duration of this pre-heating will be between 5 s and 10 s. In fact, this pre-heating will enable the polycarbonate to react more swiftly at the next station when it is subjected to the high frequency. For, below a certain temperature, the dielectric losses of the material, enabling it to get heated under the effect of the high frequency, are very small (for polycarbonate, this temperature is of the order of 100° C.) and, above this temperature, they increase swiftly. This system of thermal pre-heating, done at a first station (not shown) makes for a substantial gain in time when the operation moves to the high-frequency welding station.

This device with successive stations thus enables the fully automated batch production of cards such as these.

Moreover, this welding device using glass plates has an additional advantage for high density magnetic supports. In fact, for such magnetic supports, it is necessary to have an extremely smooth and even surface. For, the roughness and undulation of the surface of the layer would prompt spacing effects at the reading or recording heads in direct contact with said magnetic layer. These spacing effects result in a modulation of the amplitude or fluctuation in the level of the signals read or recorded, thus reducing the signal-to-noise ratio obtained. Now, when the polycarbonate layers are welded directly to metal surfaces, the peak-to-valley height obtained is about 20 nm whereas, by interposing a polished glass plate between the metal electrode and the magnetic layer, the peak-to-valley height obtained is about 4 to 5 nm. We thus obtain an improvement in the surface condition of magnetic layer. In the prior art, this was obtained by an additional calendering operation.

We claim:

1. A method for welding heat-weldable sheets, wherein at least one of the sheets is made of polycarbonate, comprising the steps of:
   (1) superimposing said heat-weldable sheets to form a sandwich;
   (2) introducing said sandwich between two metal electrodes of a high frequency press;
   (3) pressing said sandwich in the high frequency press and applying a frequency of 25–30 MHz, wherein said pressing and applying is through two glass plates each cooperating with a metal electrode of said high frequency press to heat-weld said sheets, and
   (4) cooling said heat-weldable sheets under pressure in a press which is different than said high frequency press.

2. The method of claim 1, wherein said sandwich is pre-heated to a temperature of above 100° C. before said pressing step.

3. The method of claim 2, wherein said sandwich is pre-heated to a temperature of about 150° C.

4. The method of claim 1, wherein said pressing is at a pressure of 100 to 1000 N/cm$^2$.

5. The method of claim 1, wherein said glass plates have a thickness of 2–5 mm.

6. The method of claim 1, wherein said frequency is 27.12 MHz.

7. The method of claim 1, wherein at least one of said heat-weldable sheets supports a magnetic layer.

8. The method of claim 1, wherein said heat-weldable sheets consist of polycarbonate sheets.

9. The method of claim 8, wherein said heat-weldable sheets consist of 2–10 polycarbonate sheets, each polycarbonate sheet having a thickness between 25–200 μm.

10. A method for welding heat-weldable sheets, wherein at least one of the sheets is made of polycarbonate, comprising the steps of:
    (1) superimposing said heat-weldable sheets to form a sandwich;
    (2) introducing said sandwich between two metal electrodes of a high frequency press;
    (3) positioning said sandwich between two glass plates each cooperating with a metal electrode of said high frequency press;
    (4) positioning a sheet of flexible material between said metal electrodes and said glass plates;
    (5) pressing said sandwich in the high frequency press and applying a frequency of 25–30 MHz, wherein said pressing and applying is through said glass plates and said flexible material to heat-weld said sheets; and
    (6) cooling said heat-welded sheets under pressure in a press which is different than said high frequency press.

11. The method of claim 10, wherein said flexible material comprises cardboard or polytetrafluoroethylene.

12. The method of claim 10, wherein said sandwich is pre-heated to a temperature of above 100° C. before said pressing step.

13. The method of claim 12, wherein said sandwich is pre-heated to a temperature of about 150° C.

14. The method of claim 10, wherein said pressing is at a pressure of 100 to 1000 N/cm$^2$.

15. The method of claim 10, wherein said glass plate has a thickness of 2–5 mm.

16. The method of claim 10, wherein said frequency is 27.12 MHz.

17. The method of claim 10, wherein at least one of said heat-weldable sheets supports a magnetic layer.

18. The method of claim 10, wherein said heat-weldable sheets consist of polycarbonate sheets.

19. The method of claim 10, wherein said heat-weldable sheets consist of 2–10 polycarbonate sheets, each polycarbonate sheet having a thickness between 25–200 μm.

* * * * *